United States Patent
Gallitzdorfer et al.

(10) Patent No.: US 10,675,993 B2
(45) Date of Patent: Jun. 9, 2020

(54) VEHICLE SEAT FOR A MOTOR VEHICLE AND MOTOR VEHICLE

(71) Applicant: AUDI AG, Ingolstadt (DE)

(72) Inventors: Torsten Gallitzdorfer, Riesa (DE); Adis Ragipovic, Ingolstadt (DE); Christian Becker, Ingolstadt (DE); Maximilian Fischhaber, München (DE); Andreas Richter, Gaimersheim (DE); Sven Michaelis, Ingolstadt (DE); Yunzhou Wu, Ingolstadt (DE); Karl-Heinz Rothfuß, Gaimersheim (DE)

(73) Assignee: AUDI AG, Ingolstadt (DE)

(*) Notice: Subject to any disclaimer, the term of this patent is extended or adjusted under 35 U.S.C. 154(b) by 185 days.

(21) Appl. No.: 16/050,182

(22) Filed: Jul. 31, 2018

(65) Prior Publication Data
US 2019/0054843 A1  Feb. 21, 2019

(30) Foreign Application Priority Data
Aug. 18, 2017  (DE) .................. 10 2017 007 844

(51) Int. Cl.
*B60N 2/02* (2006.01)
*B60N 2/06* (2006.01)
(Continued)

(52) U.S. Cl.
CPC .................. *B60N 2/06* (2013.01); *B60N 2/56* (2013.01); *B60N 2/976* (2018.02)

(58) Field of Classification Search
CPC ......... B60R 22/04; B60R 22/48; B60N 2/505; B60N 2/525; B60N 2/502; B60N 2/286; (Continued)

(56) References Cited

U.S. PATENT DOCUMENTS

| 4,600,239 A | * | 7/1986 | Gerstein | .................. | A61G 3/06 248/425 |
| 4,635,999 A | * | 1/1987 | Simpson | ................ | B64D 11/06 297/88 |

(Continued)

FOREIGN PATENT DOCUMENTS

| DE | 40 13 679 A1 | 11/1990 |
| DE | 10 2011 108 374 A1 | 1/2013 |
| JP | S62-97044 U | 6/1987 |

OTHER PUBLICATIONS

Examination Report dated May 28, 2018 of corresponding German Application No. 10 2017 007 844.0; 6 pgs.

*Primary Examiner* — Kiran B Patel
(74) *Attorney, Agent, or Firm* — Maier & Maier, PLLC

(57) ABSTRACT

A vehicle seat, which includes a seat part, for a motor vehicle. The seat part is fixed in place on a supporting device of the vehicle seat, said device being arranged below the seat part in the direction of a vertical axis of the vehicle seat and being able to travel together with the seat part in a longitudinal direction of the vehicle seat. The supporting device is designed as a base plate that has a front section, which, in the longitudinal direction, projects beyond a front edge of the seat part. The front section of the base plate is designed for resting the feet of an occupant of the vehicle seat. The invention further relates to a motor vehicle having such a vehicle seat.

20 Claims, 3 Drawing Sheets

(51) Int. Cl.
*B60N 2/90* (2018.01)
*B60N 2/56* (2006.01)

(58) Field of Classification Search
CPC .. B60N 2/2821; B60N 2/2839; B60N 2/3011; B60N 2/01583
See application file for complete search history.

(56) References Cited

U.S. PATENT DOCUMENTS

| | | | | |
|---|---|---|---|---|
| 5,082,326 | A | 1/1992 | Sekido et al. | |
| 5,187,820 | A * | 2/1993 | Froutzis | A47C 17/1756 5/37.1 |
| 5,967,604 | A * | 10/1999 | Yoshida | B60N 2/4221 248/429 |
| 6,474,728 | B1 * | 11/2002 | Mendis | B60K 23/00 296/190.08 |
| 6,527,327 | B2 * | 3/2003 | Gaus | B60N 2/995 296/75 |
| 6,767,040 | B1 * | 7/2004 | Freijy | B60N 2/3031 296/65.09 |
| 6,825,765 | B2 * | 11/2004 | Stanley | B60N 2/002 280/735 |
| 6,942,273 | B1 * | 9/2005 | Jseng | B60N 2/06 180/287 |
| 7,229,117 | B2 * | 6/2007 | Okuda | B60N 2/0818 296/64 |
| 7,441,822 | B1 * | 10/2008 | Day | B60N 2/01541 296/65.01 |
| 7,455,342 | B2 * | 11/2008 | Lechkun | B60N 2/995 296/64 |
| 7,686,367 | B2 * | 3/2010 | Neale | B60N 2/06 296/64 |
| 7,814,637 | B2 * | 10/2010 | Terada | B60N 2/0224 174/113 R |
| 8,215,695 | B2 * | 7/2012 | Ida | B60N 2/01583 296/65.03 |
| 8,251,335 | B2 * | 8/2012 | Kojima | B60N 2/0727 248/424 |
| 8,708,299 | B2 * | 4/2014 | Kitamura | B60N 2/073 248/424 |
| 8,801,101 | B2 * | 8/2014 | Dagcioglu | B60N 2/3011 296/65.09 |
| 8,827,367 | B2 * | 9/2014 | Hibi | B60N 2/0232 297/344.24 |
| 8,844,891 | B2 * | 9/2014 | Yamada | B60N 2/0715 248/429 |
| 9,505,417 | B2 * | 11/2016 | Yin | B60N 2/995 |
| 9,533,604 | B2 * | 1/2017 | Nakashima | B60N 2/0722 |
| 9,623,775 | B2 * | 4/2017 | Kanai | B60N 2/06 |
| 10,377,272 | B2 * | 8/2019 | Yogo | B60N 2/995 |
| 10,414,300 | B2 * | 9/2019 | Sato | B60N 2/0715 |
| 2008/0238127 | A1 * | 10/2008 | Kojima | B60N 2/0705 296/65.13 |
| 2009/0021040 | A1 * | 1/2009 | Yamasaki | B60N 2/062 296/65.13 |
| 2009/0218468 | A1 * | 9/2009 | Martel | B60N 2/0875 248/429 |
| 2009/0243325 | A1 * | 10/2009 | Villeminey | B60N 2/065 296/65.09 |
| 2010/0052392 | A1 * | 3/2010 | Lung | B60N 2/06 297/344.24 |
| 2010/0207419 | A1 * | 8/2010 | Kojima | B60N 2/0727 296/65.13 |
| 2011/0089306 | A1 * | 4/2011 | Yamada | B60N 2/0705 248/430 |
| 2011/0109114 | A1 * | 5/2011 | Kolpasky | B60N 2/01 296/65.13 |
| 2011/0278875 | A1 * | 11/2011 | Couasnon | B60N 2/067 296/65.13 |
| 2013/0214551 | A1 * | 8/2013 | Maruyama | B60N 2/015 296/65.13 |
| 2013/0328353 | A1 * | 12/2013 | Jojiki | B62D 25/20 296/193.07 |
| 2015/0306981 | A1 * | 10/2015 | Arakawa | B60N 2/0705 248/429 |
| 2017/0182913 | A1 * | 6/2017 | Uratsuji | B60N 2/0244 |

\* cited by examiner

200~# VEHICLE SEAT FOR A MOTOR VEHICLE AND MOTOR VEHICLE

FIELD

The invention relates to a vehicle seat, which comprises a seat part, for a motor vehicle. The seat part is fixed in place on a supporting device of the vehicle seat, the device being arranged below the seat part in the direction of a vertical axis of the vehicle seat. The supporting device can travel together with the seat part in a longitudinal direction of the vehicle seat. The invention further relates to a motor vehicle having such a vehicle seat.

BACKGROUND

At the present time, vehicle seats of a motor vehicle travel along seat rails or rail-like mechanisms. In this case, the seat rails are arranged on a floor of the motor vehicle. However, the rails or a cover or overlay of the rails is or are visible, or at least partially visible, when the vehicle seat travels.

JPS 6297044 U describes a vehicle seat with an understructure that can travel along two rails. The rails are embedded in a plate. The understructure of the vehicle seat is arranged above the plate and can travel along the plate.

A drawback of vehicle seats of this kind is the circumstance that, when the seat travels, the feet of a seat occupant sitting on the vehicle seat have to be guided along or pulled along. Therefore, when the vehicle seat travels in the longitudinal direction, the position of the feet placed on the floor or resting on the floor changes relative to the rest of the body of the seat occupant. Thus, in present-day vehicle seats, essentially no attention is paid to the relative movement of the feet of the seat occupant. This is associated with losses in comfort for the seat occupant.

In present-day motor vehicles, therefore, it is not taken into consideration that, when the feet of the seat occupant are placed on the floor of the motor vehicle, an angle between the feet and the rest of the body of the seat occupant changes when the vehicle seat travels forward or backward. Therefore, the feet must be repositioned or moved by the seat occupant himself/herself, so that, once again, an angle that is felt to be pleasant is present between the feet and the rest of the body of the seat occupant. A relaxed position or resting position cannot be realized in this way. This is because the position of the feet and the physical comfort thereof are not taken into consideration at the present time when the vehicle seat is adjusted.

Furthermore, the electrification of the drive of motor vehicles as well as the possibility of operating motor vehicles in an autonomous driving mode have given rise to a new interior atmosphere. This interior atmosphere allows new seat configurations. When, in the case of an electric vehicle, a transmission and a drive shaft are eliminated, the elimination thereof makes possible an essentially larger path of travel of a vehicle seat on a flat surface of a floor of the motor vehicle than is the case for a motor vehicle with a transmission and a drive shaft. However, the present-day concepts of seat rails in motor vehicles do not permit such a large path of travel to be realized. In addition, present-day seat rails do not fit into the concept of a vehicle interior or passenger compartment as an extended living space.

SUMMARY

The object of the present invention is therefore to improve a vehicle seat of the kind mentioned in the introduction in such a way that an increased seat comfort can be achieved when the seat part travels and to provide a motor vehicle with such a vehicle seat.

According to the invention, the vehicle seat for a motor vehicle comprises a seat part. The seat part is fixed in place on a supporting device of the vehicle seat. The supporting device is arranged below the seat part in the direction of a vertical axis of the vehicle seat, which is aligned parallel to the vertical axis of the vehicle when the vehicle seat is installed in the motor vehicle. The supporting device can travel together with the seat part in a longitudinal direction of the vehicle seat. In this case, the supporting device is designed as a base plate, which has a front section. In the longitudinal direction, the front section projects beyond a front edge of the seat part. The front section of the base plate is designed for resting the feet of an occupant in the vehicle seat.

Accordingly, the seat part is permanently joined to the base plate. A unit or assembly that comprises the seat part as well as the base plate is thus located above a floor of the motor vehicle when the vehicle seat is arranged in the motor vehicle. Owing to the fact that the base plate travels together with the seat part and, in particular, a backrest of the vehicle seat, the passenger or seat occupant does not need to move his or her feet when the seat part travels. Instead, the position of the feet does not change in relation to the rest of the body of the seat occupant, in particular in relation to the torso of the body and the thighs. This is due to the fact that the feet of the seat occupant resting on the front section travel together with the seat part and the backrest when they travel in the longitudinal direction of the vehicle seat. For a vehicle seat arranged in the motor vehicle, this longitudinal direction is parallel to the longitudinal axis of the motor vehicle.

The concept of the vehicle seat with the base plate that travels with it makes possible, on the one hand, a non-visible installation of a position adjustment device for moving the seat part and the backrest in the longitudinal direction of the vehicle seat. In addition, the interior or passenger compartment of the motor vehicle can be utilized optimally as an extended living space. This is because it is also possible to realize especially long paths of travel, without the position of the feet of the seat occupant changing in relation to the rest of the body of said occupant when the seat part travels. A freely configured seat is thus made possible in the motor vehicle, in which the passenger or seat occupant and the vehicle seat are adapted to each other.

Furthermore, an increased seat comfort can be achieved when the seat part travels, because it is not necessary for the feet of the seat occupant to be pulled along when the seat part travels, but instead the feet resting on the front section of the base plate travel together with the seat part in the longitudinal direction of the vehicle seat.

Preferably, the front section of the base plate is dimensioned at least in such a way that the seat occupant can fully rest the soles of his or her feet on the surface of the front section of the base plate. In this way, it is possible to achieve an especially comfortable seat position for the seat occupant in any position of travel of the vehicle seat traveling in the longitudinal direction. Taken into consideration here are, in particular, the physical dimensions of an ergonomic dimensional model of the seat occupant, perhaps for example, the 95$^{th}$ percentile man.

Preferably, the feet of the seat occupant can rest fully on the surface of the front section of the base plate when the feet are aligned essentially perpendicularly to the lower legs of the seat occupant. Furthermore, it is preferably provided that the soles of the feet can rest in full on the surface of the front section of the base plate even when the feet form an obtuse angle with the lower legs of the seat occupant. In this way, diverse comfortable seat positions for the seat occupant of the vehicle seat are made possible.

Preferably, the size of the base plate is matched to the length of a path of travel of the seat part. The length of the path of travel of the seat part can depend, in turn, on the length of a rail of a position adjustment device for translational movement of the base plate in the longitudinal direction. By matching the size of the base plate to the length of such a rail, it can be ensured that a position adjustment mechanism that serves for travel of the seat part is hidden.

In particular, furthermore, the size of the base plate is matched to a seat position of the seat occupant and to the length of the legs of the seat occupant. In this case, physical dimensions of the ergonomic dimensional model of the seat occupant are also taken into consideration. Whether the seat position of the seat occupant is somewhat upright or somewhat recumbent depends, in particular, on the structural shape of the body of the motor vehicle.

Preferably, the base plate covers a position adjustment device, which is designed for the translational movement of the base plate in the longitudinal direction. The base plate thus preferably covers the position adjustment device or position adjustment mechanism in any position and over the entire path of travel. This makes possible a very clean and uncluttered design of the vehicle seat. A modern, tidy outward impression of the vehicle seat or of the motor vehicle equipped with the vehicle seat is also achieved. In particular, it is possible in this way to achieve an outward impression of the vehicle seat or of the motor vehicle such as that specific for a motor vehicle constructed as an electric vehicle. In addition, in this configuration, the base plate protects the position adjustment device against soiling, so that the position adjustment device has an especially long service life.

Preferably, the position adjustment device comprises at least one rail that can travel together with the base plate in the longitudinal direction. For example, the at least one rail can be designed as a toothed rack or comprise a toothed rack, which can travel in the longitudinal direction by means of a sprocket of at least one drive device in order to bring about the translational movement of the base plate and, accordingly, also of the seat part as well as of a backrest of the vehicle seat. Through the provision of the at least one rail, it is possible to realize the translational movement of the base plate together with the seat part in an especially simple manner.

It has been found to be further advantageous when the base plate is coupled to the at least one rail in a first end portion of the at least one rail and in a second end portion of the at least one rail. In this way, it is possible to achieve an especially stable and tilt-proof connection of the base plate to the at least one rail.

The at least one drive device for longitudinal position adjustment of the vehicle seat, that is, for travel of the base plate, of the seat part, and of the backrest in the longitudinal direction of the vehicle seat, can be designed, in particular, as an electric motor. It is thus possible to provide an electrical longitudinal position adjustment of the vehicle seat.

Preferably, a length of the front section is equal to or greater than a length of a path of travel of the seat part. In this way, it can be ensured in an especially simple manner that, over the entire path of travel, components of the position adjustment device for translational movement of the base plate in the longitudinal direction are covered or hidden. This applies, in particular, when the length of the front section is longer than the maximum path of travel. In particular, it can thus be ensured that at least one rail of the position adjustment device is located in a non-visible region.

Preferably, at least one sub-region of the front section can move from a first position into a second position. In the second position, the sub-region is arranged higher in the direction of the vertical axis than it is in the first position. In this way, the base plate can become transformed in the sub-region of the front section into a more elevated foot rest or foot bench. In particular, at least the sub-region of the front section can move into different second positions depending on individual requirements of the seat occupant and, accordingly, can become transformed into a foot rest with different heights.

The partial raising of at least the sub-region of the base plate offers a perfect foot rest for each seat adjustment of the vehicle seat. When, for example, the sub-region is raised so far that its height roughly corresponds to or exceeds that of the seat part, then it is possible to realize a very comfortable recumbent position for the seat occupant. When the seat occupant is seated upright, the foot rest formed by the adjustable height sub-region can be lowered further in comparison thereto, in particular, to the level of the remaining base plate. It is thus possible, even in the upright seat position, to achieve a greater seat comfort with a foot rest that is pleasant for the seat occupant.

It is also possible to move the entire front section from the first position into the second position (and back).

In particular, it is possible to provide at least one air cushion or to arrange at least one air cushion in the base plate for moving the sub-region or the front section from the first position into the second position. By providing at least one air cushion in the sub-region of the front section, it is possible, in addition, to provide an especially soft foot rest.

Furthermore, the material of the base plate in at least the sub-region can be designed to be flexibly and elastically deformable in such a way that, by introducing air, it is possible to effect the raising of the sub-region, that is, to bring the sub-region from the first position into the second position.

However, it is also possible to provide mechanical devices for adjusting the position of at least the sub-region in terms of height. For example, the sub-region can be designed so as to be moved from the first position into the second position and back by means of at least one lever and/or via cylinders or the like. In particular, for adjusting the position of at least the sub-region in terms of height, it is possible to utilize electric and/or hydraulic and/or pneumatic actuators.

In the sub-region that can move from the first position into the second position, the base plate can have, in particular, electrically conductive plastics, which, through application of an electric voltage, can bring about the movement of the sub-region from the first position into the second position. Such plastics or plastic layers or plastic regions can be provided, in particular by a 3D printing method, on the base plate or in the base plate. By way of such material formed by 3D printing, it is thus possible to achieve a programmed movement pattern of at least the sub-region of the front section by application of an electric voltage. Such an ability to adjust the position of the sub-region of the front section can be realized in an especially simple manner.

Owing to the fact that at least the sub-region of the front section can move from the first position into the second position, that is, the base plate can be transformed into an ottoman or foot stool for a perfect foot rest, it is not necessary to provide a separate component in order to create a foot rest. The complexity of the vehicle seat is thereby reduced and the available space is utilized very efficiently, since, by means of the base plate with the adjustable height sub-region of the front section, a two-in-one solution is realized, for which, by one and the same component, both the function of a foot rest for a normal position of the seat occupant and also the function of an elevated foot stool are provided.

For the comfort of the seat occupant, it is furthermore beneficial when the front section has at least one heating device. In particular, a radiant panel heating can be formed in the front section, such as, for instance, by laying down heating wires in the front section. Through such a base plate that can be heated at least in regions thereof, the seat occupant is afforded the comfort of an underfloor heating, such as in a living room.

Additionally or alternatively, the front section can have at least one massage device. This offers a wellness function in that, by operation of the at least one massage device, a foot massage can be carried out. The at least one massage device can comprise at least one cell that can be filled with air or another medium and/or spherical or hemispherical elements that can be moved, in particular by use of an electric motor, for massaging the seat occupant.

Additionally or alternatively, the front section can have at least one vibration device. In this way, it is possible by means of an electric motor, for example, to set weights into vibration and/or the front section as such can be set into vibration, at least in sections thereof. Through such vibration devices or vibration modules, it is possible to increase the comfort for the seat occupant.

The provision of the at least one heating device and/or of the at least one massage device and/or of the at least one vibration device makes it possible to afford the passenger or seat occupant a feeling of comfort and to characterize a relaxed living space or a wellness oasis.

The motor vehicle according to the invention has at least one vehicle seat according to the invention. The vehicle seat can be, in particular, a driver's seat, a passenger seat, or a vehicle seat of a second row of seats, a third row of seats, or the like. The motor vehicle can be designed, in particular, as an electric vehicle and/or as a motor vehicle that can be driven in an autonomous driving mode.

In particular, the base plate of the vehicle seat is arranged above a floor of the motor vehicle in the direction of the vertical axis. Accordingly, through the base plate, a kind of cladding element for the floor of the motor vehicle is provided. The seat occupant can rest his or her feet on this cladding element. When the vehicle seat is adjusted in position in the longitudinal direction of the vehicle seat, said longitudinal direction coinciding with a longitudinal axis of the vehicle or being aligned parallel to the longitudinal axis of the vehicle, the feet of the seat occupant travel and move in a translational manner together with the seat part and preferably also with the backrest of the vehicle seat.

Preferably, a position adjustment device for travel of the base plate in the longitudinal direction comprises at least one rail, which is arranged in the base plate. A drive device for translational movement of the at least one rail is kept here on the floor of the motor vehicle. Through such a low arrangement of the drive device for travel of the vehicle seat, a lower center of gravity of the position adjustment device is achieved. This facilitates the connection of the vehicle seat on the floor of the motor vehicle in a durable way.

Preferably, the at least one rail is coupled to the floor of the motor vehicle, at least at a first connection point and at a second connection point. The at least two connection points are spaced apart from one another in the longitudinal direction. In this way, a robust and tilt-proof connection of the vehicle seat to the floor of the motor vehicle and accordingly to the body is ensured.

The invention also includes enhancements of the motor vehicle, which have such features as have already been described in connection with the enhancements of the vehicle seat. For this reason, the corresponding enhancements of the motor vehicle are not described here once again.

BRIEF DESCRIPTION OF THE DRAWINGS

An exemplary embodiment of the invention is described below. Shown for this purpose are.

DETAILED DESCRIPTION

The exemplary embodiment explained below is a preferred embodiment of the invention. In the exemplary embodiment, the described components of the embodiment each represent individual features of the invention, which are to be regarded as being independent of one another and which each also enhance the invention independently of one another, and accordingly are to be regarded, also individually or in a combination different from that shown, as belonging to the invention. Furthermore, the described embodiment can also be supplemented by features of the invention that are additional to those already described.

In the figures, functionally identical elements are furnished with the same reference numbers.

Figure 1:
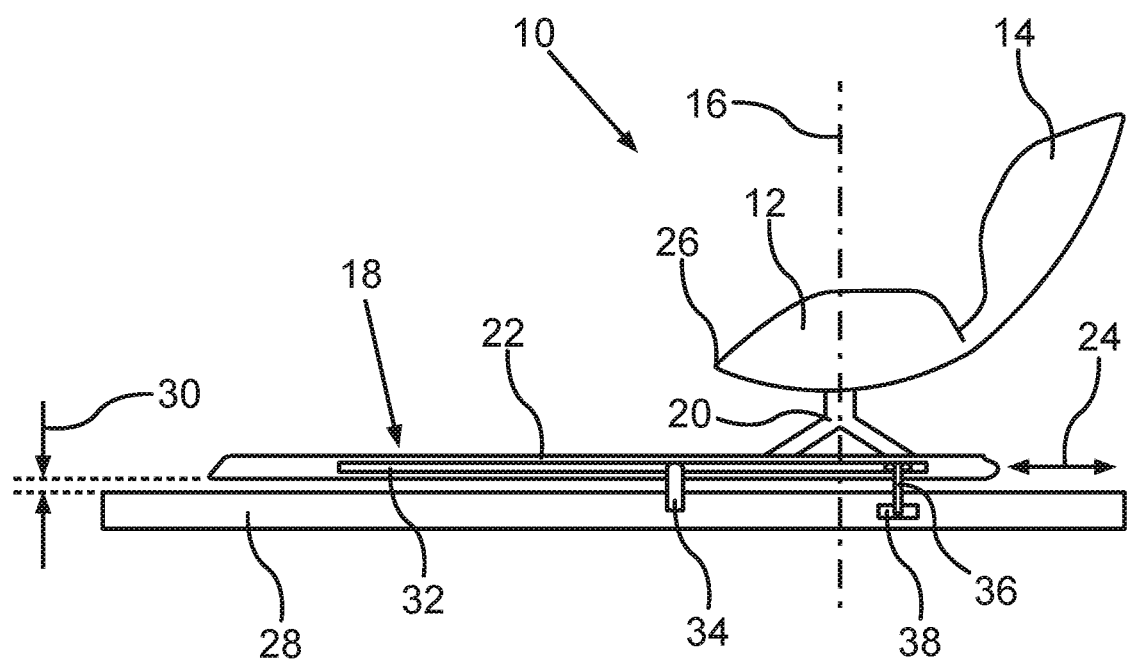
FIG. 1 in greatly schematized form, a vehicle seat arranged in a motor vehicle, comprising a base plate that is permanently joined to a seat part of the vehicle seat, wherein the base plate can be shifted in position together with the seat part in a longitudinal direction of the motor vehicle.

A vehicle seat 10, shown in FIG. 1, for a motor vehicle comprises a seat part 12 and a backrest 14. In the direction of a vertical axis 16 of the vehicle seat 10, a base plate 18 is arranged below the seat part 12. Via a support device 20, the seat part 12 is joined permanently to the base plate 18 of the vehicle seat 10. In other words, via the support device 20, the seat part 12 rests against the base plate 18, so that the base plate 18 serves as a bearing element or supporting device for the seat part 12 and the backrest 14 arranged at the seat part 12.

The base plate 18 comprises a front section 22, which, in the longitudinal direction 24 of the vehicle seat 10, projects beyond a front edge 26 of the seat part 12. The longitudinal direction 24, which is indicated in FIG. 1 by a double arrow, extends parallel to the longitudinal axis of the vehicle when the vehicle seat 10 is arranged in the motor vehicle. A direction of position adjustment is also specified by the longitudinal direction 24, in which the vehicle seat 10 can travel during longitudinal position adjustment thereof.

When a seat occupant (not shown) is seated on the vehicle seat 10, the feet of the seat occupant are placed on the front section 22 of the base plate 18. If the vehicle seat 10, that is, the seat part 12 together with the base plate 18, then travels in the longitudinal direction 24, a position of the feet of the seat occupant on the base plate 18 does not change. Instead, the feet, which are exactly in the position that the seat occupant has assumed on the vehicle seat 10, travel forward or backward together with the seat part 12 and the base plate 18.

In the present case, only a part of the body structure of the motor vehicle in which the vehicle seat 10 is arranged is shown in the form of a floor 28 of the motor vehicle. As can be seen from FIG. 1, the base plate 18 is arranged at a short distance 30—for example, at a distance of less than 3 millimeters—over the floor 28 or vehicle floor. The unit that comprises the base plate 18 and the seat part 12 as well as the backrest 14, that is, in other words, the vehicle seat 10, therefore floats at a small distance 30 over the actual floor 28 or vehicle floor.

For the variant of the vehicle seat 10 shown in FIG. 1, a rail 32 is integrated in the base plate 18. By way of a first holder 34 and by way of a second holder 36, the rail 32 is fixed in place on the floor 28. Accordingly, the holders 34, 36 serve as connection points at which the rail 32 is coupled to the floor 28. When the vehicle seat 10 and accordingly also the rail 32 integrated in the base plate 18 travel in the longitudinal direction 24, the holders 34, 36, serving as fixations for the rail 32, remain fixed in position, since the holders 34, 36 are permanently built into the floor 28. However, the rail 32 will travel forward or backward along the holders 34, 36, which are spaced apart from each other in the longitudinal direction 24. This longitudinal position adjustment of the vehicle seat 10 is effected preferably by an electric drive device 38, which is schematically shown in FIG. 1 arranged at the level of the second holder 36.

For example, the drive device 38 can drive a sprocket or gearwheel, which is in engagement with teeth arranged at the rail 32. Accordingly, through the rail 32, a toothed rack is provided. However, it is also possible to provide other mechanisms for travel of the rail 32 along the floor 28. For the variant of the vehicle seat 10 shown in FIG. 1, due to the fact that the rail 32 is situated in the base plate 18 and the drive or the drive device 38 is situated in the region of the floor 28, the center of gravity of a position adjustment device, comprising the rail 32 and the drive device 38, for the longitudinal position adjustment of the vehicle seat 10 is located relatively low. The rail 32 makes possible a longitudinal position adjustment, in particular an electrical longitudinal position adjustment, of the seat unit or of the vehicle seat 10.

Figure 2:
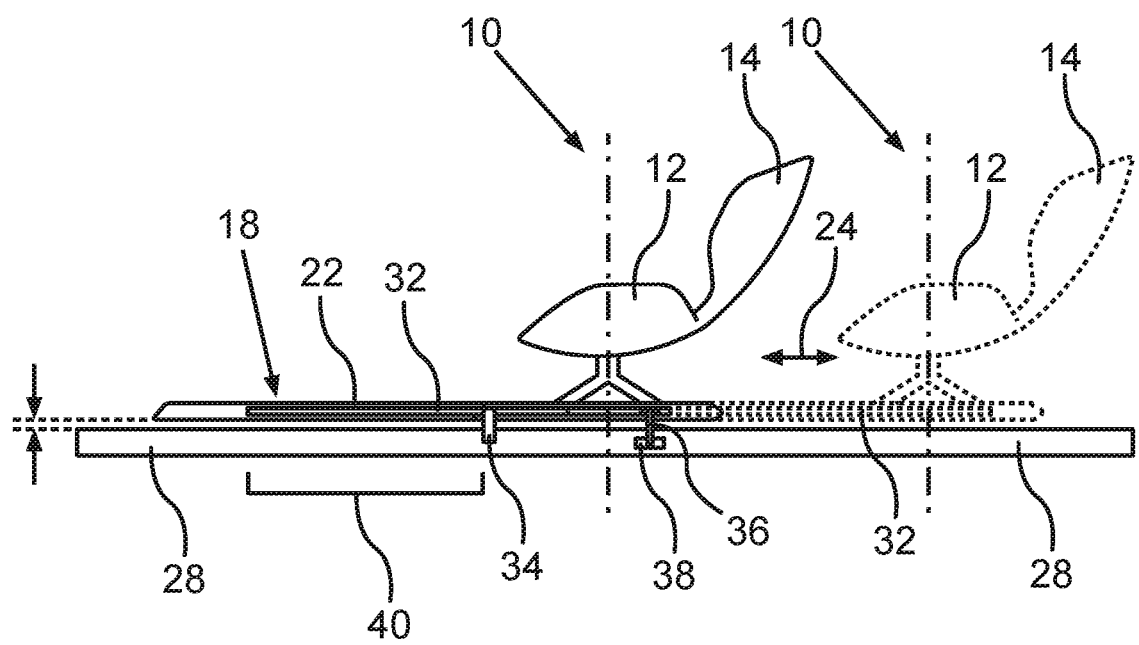
FIG. 2 the shift in position of the vehicle seat together with the base plate from a seat position at the front into a seat position displaced toward the back.

In FIG. 2, the vehicle seat 10 is shown once in a forward position, in which the rail 32 and the base plate 18 have traveled maximally toward the front. Accordingly, the rear holder 36 in the longitudinal direction 24 is situated in a rear end portion of the rail 32. However, both the rear holder 36 and therefore the front holder 34 are covered by the base plate 18.

If the vehicle seat 10 travels maximally toward the back in the longitudinal direction 24, then the front holder 34 arrives in a front end portion of the rail 32. The length of a corresponding path of travel 40 of the seat part 12 is illustrated in FIG. 2. Even when the seat part 12 has traveled by this maximum path of travel 40 from the front position into the backward displaced position, the base plate 18 still covers both the front holder 34 and thus the backward displaced holder 36 and the drive device 38. Through the length of the base plate 18, therefore, it is achieved in the present case that, even for a longitudinal position adjustment of the vehicle seat 10 by the maximum path of travel 40, the position adjustment device or position adjustment mechanism remains in the non-visible region below the base plate 18.

Figure 3:
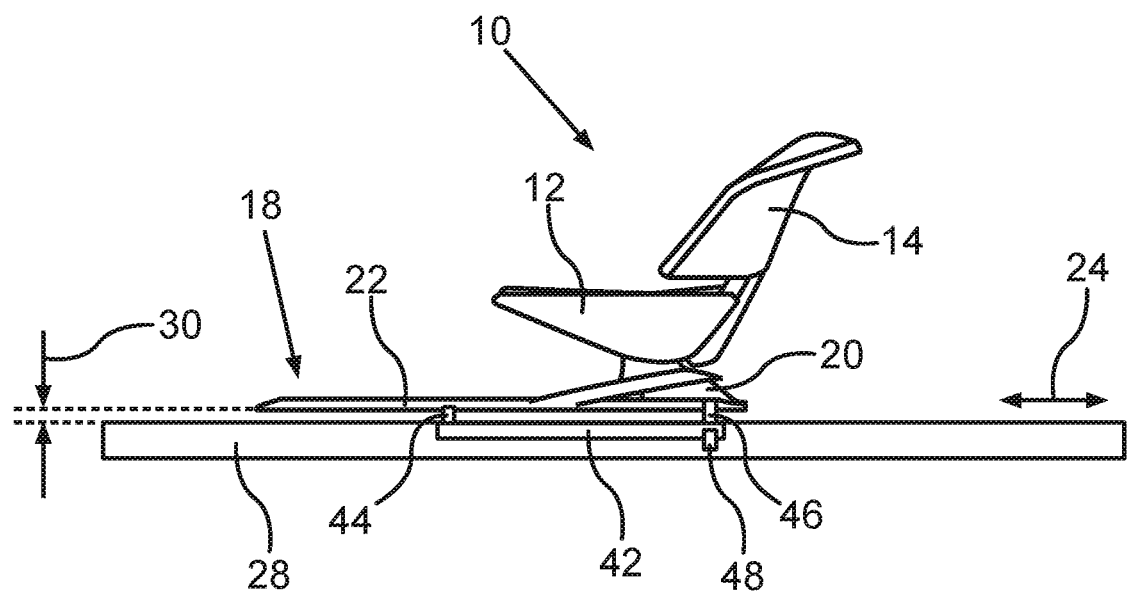
FIG. 3 a variant of the arrangement of the vehicle seat in the motor vehicle, wherein the base plate is joined to a rail, which, in the region of the vehicle floor, can be shifted in position together with the base plate in the longitudinal direction.

Shown in FIG. 3 is a variant of the vehicle seat 10. In this case, the vehicle seat 10 also comprises the base plate 18, at which the seat part 12 is supported via the support device 20. However, for this arrangement of the vehicle seat 10 in the motor vehicle, the base plate 18 is joined to a rail 42, which is arranged within the floor 28 or vehicle floor. In a first end portion of the rail 42, the base plate 18 is coupled to the rail 42 via a first, front holder 44. In a rear end portion of the rail 42, the base plate 18 is coupled to the rail 42 via a second, rear holder 46. The distance 30 between bottom side of the base plate 18 and the top side of the floor 28 is adjusted through the height of the holders 44, 46.

For the variant shown in FIG. 3, the rail 42 also travels together with the base plate 18 in the longitudinal direction 24 when a longitudinal position adjustment of the vehicle seat 10 is made. An electric drive motor or a similar drive device 48 for travel of the rail 42 and, accordingly, of the vehicle seat 10 in the longitudinal direction 24, is shown schematically in FIG. 3. The drive device 48 is built into the floor 28. Owing to the fact that both the rail 42 and also the drive device 48 are situated within the floor 28, the center of gravity of the position adjustment device is especially low for this vehicle seat 10.

Figure 4:
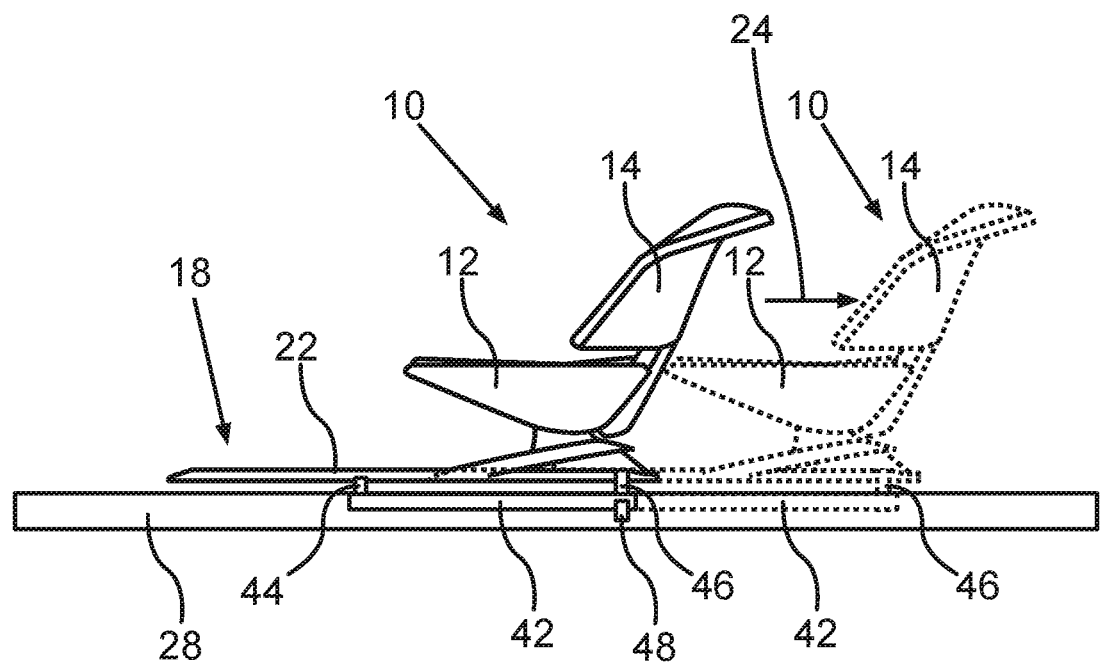
FIG. 4 the shift in position of the vehicle seat together with the base plate and the rail from a seat position at the front into a seat position displaced toward the back.

Shown in FIG. 4, in turn, is the vehicle seat 10 in accordance with FIG. 3, once in its front position and once in its backward displaced position. In the front position, the rear holder 46 is situated at the level of the drive device 48. In the backward displaced position of the vehicle seat 10, the front holder 44 is situated at the level of the drive device 48. The front section 22 of the base plate 18 covers the drive device 48 in this backward displaced position of the vehicle seat 10 as well, and the rail 42 as well as the holders 44, 46 are also not visible.

Figure 5:
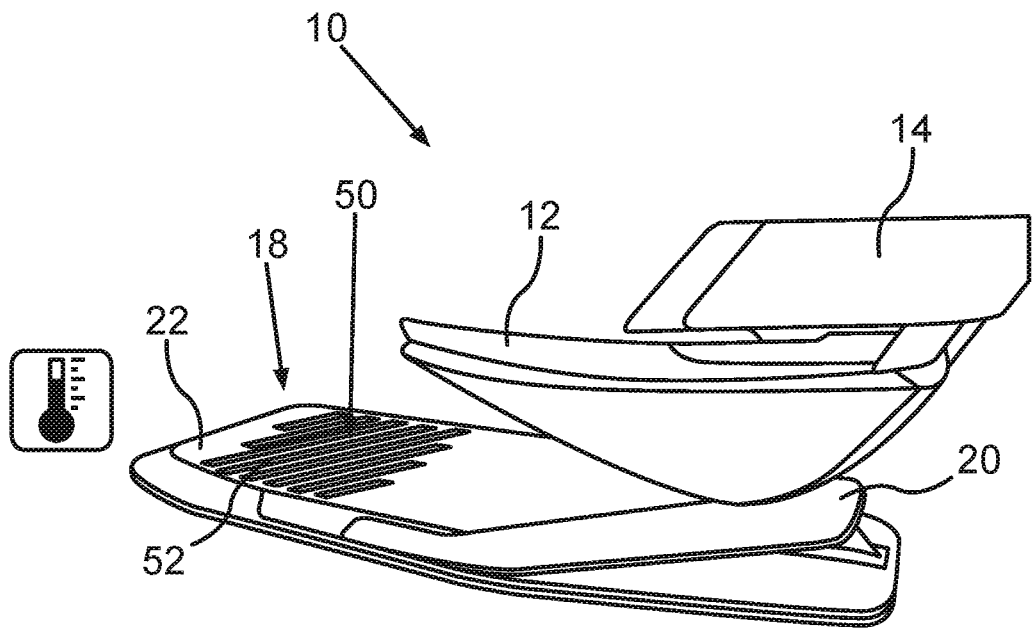
FIG. 5 in a perspective view, the vehicle seat with an underfloor heating that is formed in a front section of the base plate.

In the variant of the vehicle seat 10 shown in FIG. 5, a heating device 52 is arranged in a sub-region 50 of the front section 22. This heating device is designed as an underfloor heating of the type of a radiant panel heating. Such an underfloor heating affords the seat occupant a greater seat comfort when the seat occupant rests his or her feet in the sub-region 50 or on the sub-region 50 in which the heating device 52 is provided.

Figure 6:
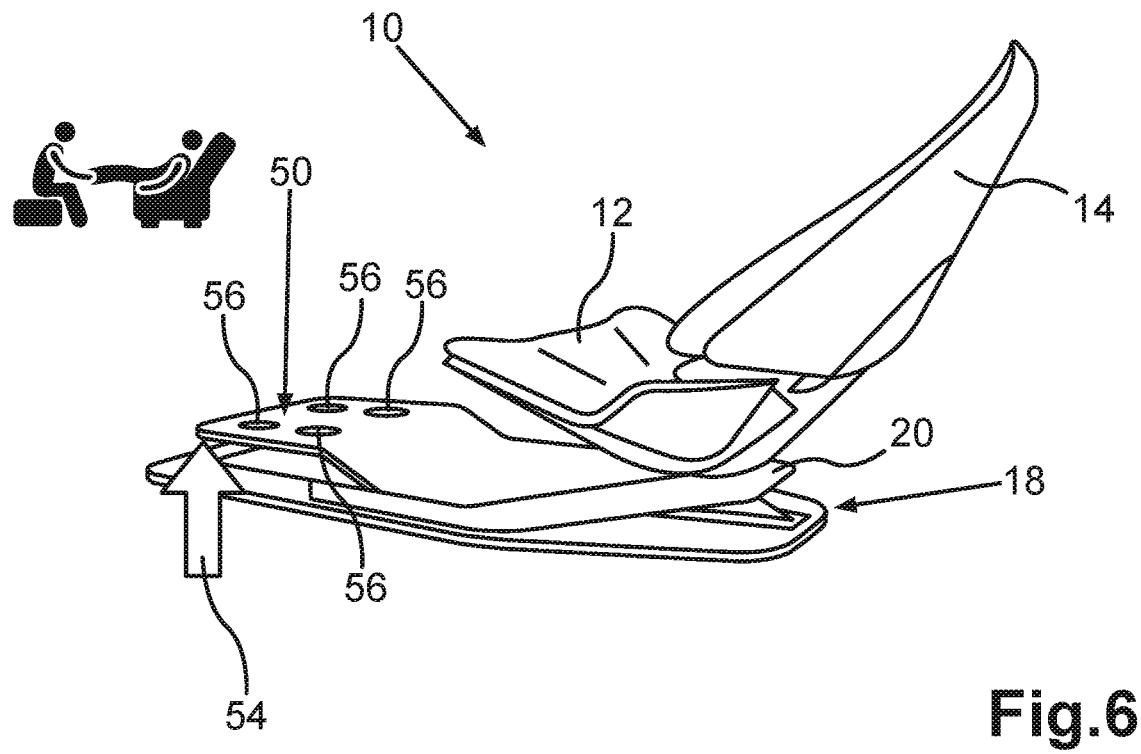
FIG. 6 in another perspective view, the raising of a sub-region of the front section for providing a foot stool, with the massage elements arranged in the base plate being additionally shown.

In accordance with the variant of the vehicle seat 10 shown in FIG. 6, the sub-region 50 of the front section 22 can be designed so as to be adjustable in height. Thus, through this sub-region 50, a kind of foot stool or a foot rest is provided. The adjustability of the height of the sub-region 50 is indicated in FIG. 6 by an arrow 54. In order to provide such a foot stool or a foot bench, the height adjustment can be achieved by an air cushion function. Furthermore, the base plate 18 can comprise a material that is provided, in particular, by a 3D printing method, in which, through application of an electric voltage, the movement of the sub-region 50 upward, that is, the height adjustment of the sub-region 50, can be provided. Furthermore, mechanical position adjustment devices (not shown) can bring about the height adjustment of the sub-region 50.

Additionally or alternatively, it is possible to arrange massage elements or massage devices 56 in the front section 22 in order to provide a massage function for the seat occupant. For example, the massage devices 56 can be designed as a mass vibrator, that is, as a body or weight that, by use of at least one motor, in particular at least one electric motor, is set into vibration. Additionally or alternatively to such vibration modules, the massage elements or massage devices 56 can also be provided through cells that can be filled with air or a similar medium, mobile spheres or hemispheres, or the equivalent.

Through an underfloor heating and massage module or vibration module in the region of the base plate 18 in which the seat occupant places his or her feet, the seat occupant can be afforded a feeling of comfort and the passenger compartment of the motor vehicle becomes a living space, in which relaxation prevails, or is transformed into a wellness oasis. If, as shown for the variant of the vehicle seat 10 in FIG. 6 by way of example, the base plate 18 in the region provided for the elevated foot rest can deform, then it is not necessary to provide for any additional components in the form of a separate foot stool or the like. In this way, the existing space is utilized especially efficiently.

Overall, the example shows how, through the invention, a vehicle seat 10, including a floor that travels with it or a base plate 18 that travels with it, is provided.

The invention claimed is:

1. A vehicle seat, which comprises:
a seat part, for a motor vehicle, wherein the seat part is fixed in place on a supporting device of the vehicle seat, said device being arranged below the seat part in the direction of a vertical axis of the vehicle seat and being able to travel together with the seat part in a longitudinal direction of the vehicle seat, wherein the supporting device is designed as a base plate that has a front section, which, in the longitudinal direction, projects beyond a front edge of the seat part, wherein the front section of the base plate is designed for resting the feet of an occupant of the vehicle seat.

2. The vehicle seat according to claim 1, wherein a position adjustment device for translational movement of the base plate in the longitudinal direction is covered by the base plate.

3. The vehicle seat according to claim 2, wherein the position adjustment device comprises at least one rail, which can travel together with the base plate in the longitudinal direction.

4. The vehicle seat according to claim 3, wherein in a first end portion of the at least one rail, the base plate is coupled to the at least one rail, and in a second end portion of the at least one rail is coupled to the at least one rail.

5. The vehicle seat according to claim 1, wherein a length of the front section is equal to or greater than a length of a path of travel of the seat part.

6. The vehicle seat according to claim 1, wherein at least one sub-region of the front section can move from a first position into a second position, in which the sub-region is arranged higher in the direction of the vertical axis than in the first position.

7. The vehicle seat according to claim 1, wherein the front section has at least one heating device and/or at least one massage device and/or at least one vibration device.

8. A motor vehicle with at least one vehicle seat according to claim 1, wherein the base plate of the vehicle seat is arranged above a floor of the motor vehicle in the direction of the vertical axis.

9. The motor vehicle according to claim 8, wherein a position adjustment device for travel of the base plate in the longitudinal direction comprises at least one rail, which is arranged in the base plate, wherein a drive device for the translational movement of the at least one rail is held on the floor of the motor vehicle.

10. The motor vehicle according to claim 9, wherein the at least one rail is coupled to the floor of the motor vehicle at least at a first connection point and at a second connection point, which are spaced apart from one another in the longitudinal direction.

11. The vehicle seat according to claim 2, wherein a length of the front section is equal to or greater than a length of a path of travel of the seat part.

12. The vehicle seat according to claim 3, wherein a length of the front section is equal to or greater than a length of a path of travel of the seat part.

13. The vehicle seat according to claim 4, wherein a length of the front section is equal to or greater than a length of a path of travel of the seat part.

14. The vehicle seat according to claim 2, wherein at least one sub-region of the front section can move from a first position into a second position, in which the sub-region is arranged higher in the direction of the vertical axis than in the first position.

15. The vehicle seat according to claim 3, wherein at least one sub-region of the front section can move from a first position into a second position, in which the sub-region is arranged higher in the direction of the vertical axis than in the first position.

16. The vehicle seat according to claim 4, wherein at least one sub-region of the front section can move from a first position into a second position, in which the sub-region is arranged higher in the direction of the vertical axis than in the first position.

17. The vehicle seat according to claim 5, wherein at least one sub-region of the front section can move from a first position into a second position, in which the sub-region is arranged higher in the direction of the vertical axis than in the first position.

18. The vehicle seat according to claim 2, wherein the front section has at least one heating device and/or at least one massage device and/or at least one vibration device.

19. The vehicle seat according to claim 3, wherein the front section has at least one heating device and/or at least one massage device and/or at least one vibration device.

20. The vehicle seat according to claim 4, wherein the front section has at least one heating device and/or at least one massage device and/or at least one vibration device.

* * * * *